Oct. 21, 1941.　　　D. W. MOORE, JR　　　2,260,122
ELECTRICAL CONTROL SYSTEM
Filed Jan. 3, 1941　　　2 Sheets-Sheet 1
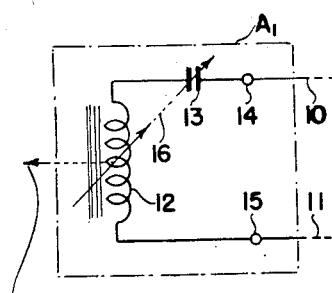
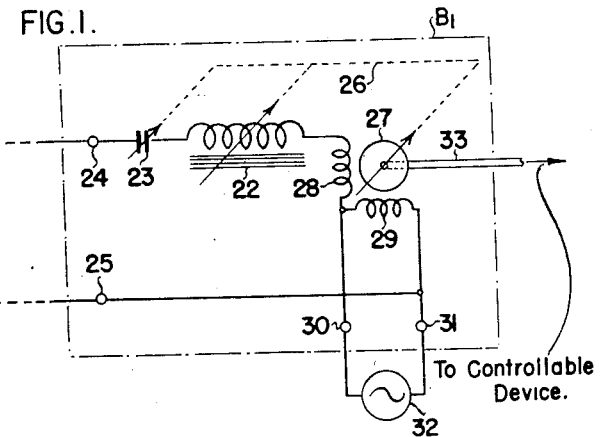
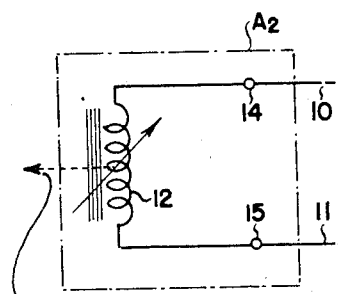
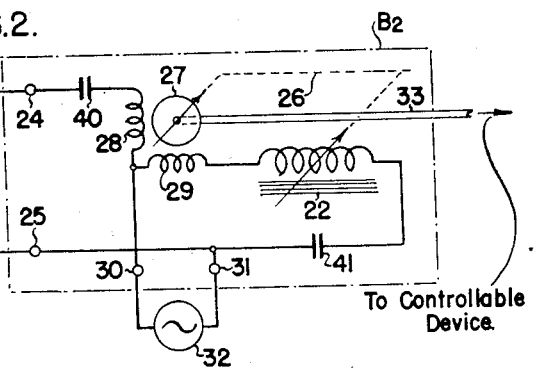
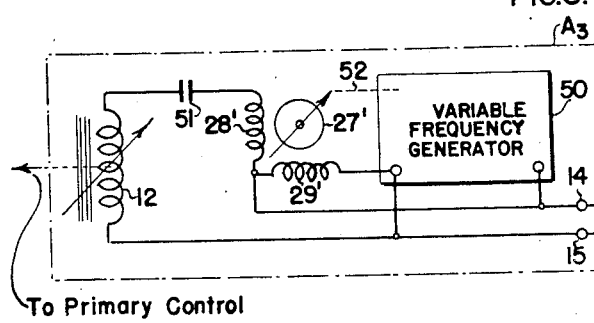
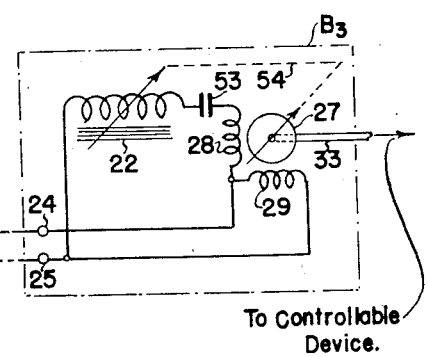
INVENTOR
DAVID W. MOORE, Jr.
BY Laurence B Dodds
ATTORNEY

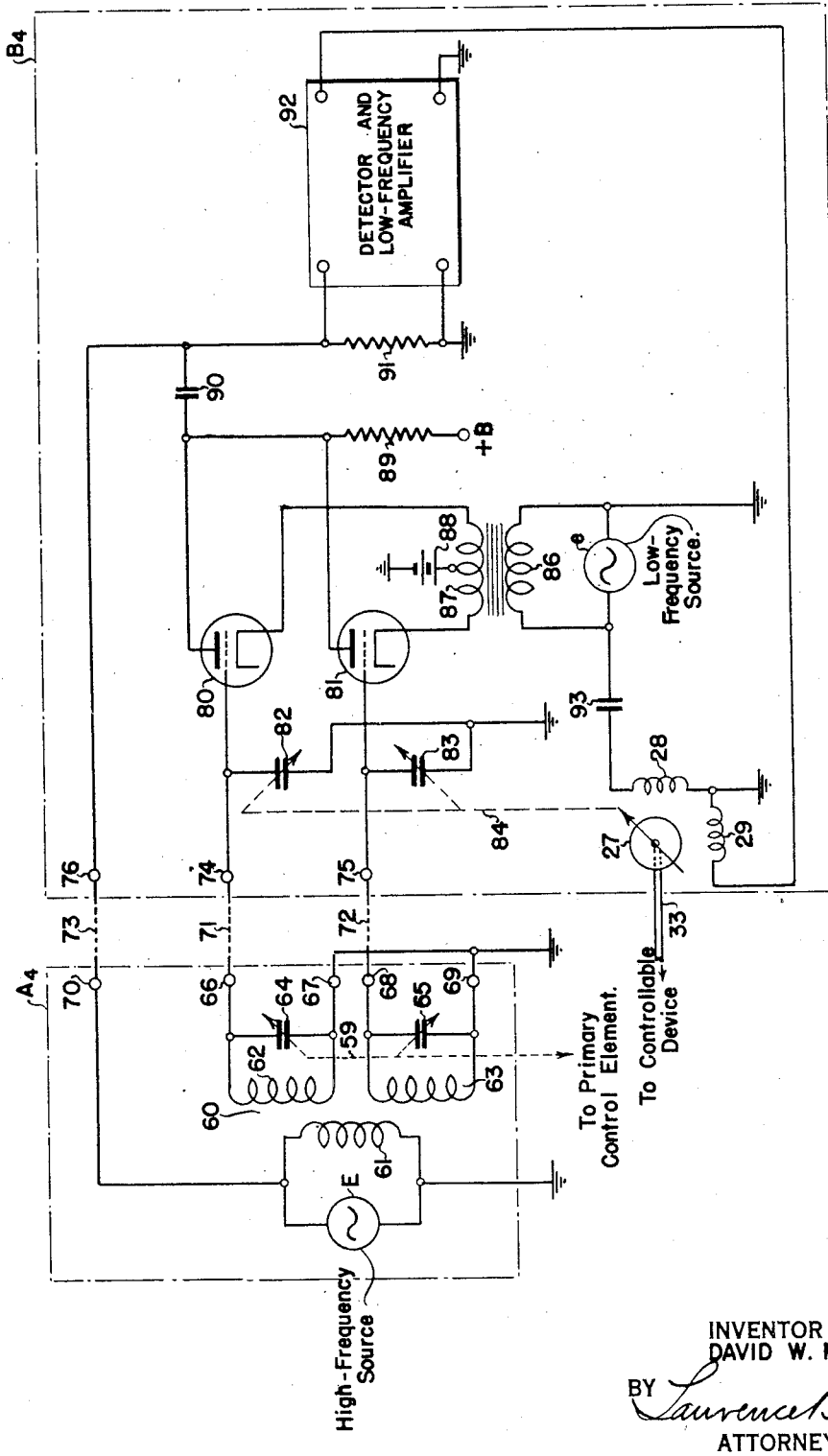

Patented Oct. 21, 1941

2,260,122

UNITED STATES PATENT OFFICE 2,260,122

ELECTRICAL CONTROL SYSTEM

David W. Moore, Jr., New York, N. Y., assignor to Fairchild Aviation Corporation, a corporation of New York Application January 3, 1941, Serial No. 372,994

15 Claims. (Cl. 172—239)

This invention relates to electrical control systems and is particularly adapted to such systems for the control of a secondary controllable device in response to variations in an electrical condition of an electrical apparatus at a control station which, in turn, may be representative of the position or other characteristic of a primary control member. The invention is of general application to remote control systems, follow-up systems, telemetering systems, and any system for the transmission of a control effect or indication in response to variations in a condition of a primary controlling or indicating element. The control station and the secondary controllable device may be a part of the same control unit or they may be located at stations relatively remote from each other.

Heretofore numerous remote control and follow-up systems of the type described have been proposed. In general, such systems have not been completely satisfactory because of the fact that they were subject to a number of shortcomings and limitations, among which may be mentioned very small power and torque output, nonlinear translation characteristic, multiple-conductor cables linking the control and controlled stations, impairment of accuracy by variations in the frequency or voltage of the power supply, electrical contacts or switches subject to deterioration, accuracy dependent to a high degree upon precision mechanical elements, and ambiguous indications under certain conditions including the possibility of a lack of synchronism between the control and controlled elements.

It is an object of the present invention, therefore, to provide a new and improved electrical control system of the type described which overcomes one or more of the above-mentioned disadvantages of the prior art arrangements.

It is another object of the invention to provide a new and improved electrical control system of the type described having one or more of the following desirable characteristics: substantial power and torque output, linear translation characteristic, a minimum of interconnecting conductors between the control and controlled stations, independence between the operating characteristics and the frequency and voltage of the power supply, freedom from electrical contacts and switches, accuracy determined primarily by the values of stable electrical elements, and a positive and unambiguous operation of the controlled device which is rigidly maintained in synchronism with the control device.

In accordance with the invention, an electrical control system adapted to control a secondary controllable device comprises a control station including an electrical apparatus subject to variations in a predetermined electrical condition thereof and a controlled station, either as a part of the same unit as the control station or remote therefrom. The controlled station includes an adjustable reactance means and is connected to the control station by way of a control-signal translating path. Supply terminals are provided in one of the stations for connection to a source of periodic current. The system also includes additional reactance means connected in circuit with the adjustable reactance means to resonate therewith, connections from the electrical apparatus and from the reactance means to the control-signal translating path effective to cause the reactance means to depart from resonance in accordance with variations in the electrical condition of the apparatus, and a normally balanced phase-responsive device at the controlled station connected to be energized from the supply terminals and unbalanced in response to departures from resonance of the adjustable reactance means, due to variations in the electrical condition of the apparatus at the control station, for adjusting the reactance means directly and independently of conditions at the control station to restore its balance and for actuating the secondary controllable device.

In a preferred embodiment of the invention, the electrical apparatus at the control station is also an adjustable reactance means, such as an adjustable inductance, of the same type as, and having complementary laws of reactance variation as, that of the reactance means at the controlled station and the phase-responsive device is preferably a two-phase torque motor.

For a better understanding of the invention, together with other and further objects thereof, reference is had to the following description taken in connection with the accompanying drawings and its scope will be pointed out in the appended claims.

In the drawings, Fig. 1 is a circuit diagram of an electrical control system embodying the invention and designed to operate at a fixed frequency; Fig. 2 is a circuit diagram of a modified form of the invention adapted to operate over a range in frequencies; Fig. 3 is a circuit diagram of a form of the invention in which the frequency of the source of supply is automatically varied in operation; and Fig. 4 is a circuit diagram of a modified form of the invention particularly suitable for the use of a high frequency between the control and controlled stations.

Referring now to Fig. 1 of the drawings, there is represented an application of the invention to a follow-up system comprising a control station A₁ and a remote controlled station B₁ interconnected over a control-signal translating path comprising the conductors 10 and 11, one of which may be ground. The control station A₁ comprises primary adjustable reactance devices such as an adjustable inductance 12 and an adjustable condenser 13 connected in series across the terminals 14, 15 of the station. The elements 12 and 13 are connected for adjustment in unison by a primary control element by means of a mechanical link 16. The controlled station B₁ comprises secondary adjustable reactance devices such as an adjustable inductance 22 and an adjustable condenser 23 connected in circuit with a winding 28 of a normally balanced phase-responsive device such as a two-phase motor 27, the terminals of this circuit being connected to an input terminal 24 of the station B₁ and a periodic-current supply terminal 30. The circuit of the elements 22 and 23 is completed through the conductors 10 and 11 and the circuit at the control station A₁ to the input terminal 25 of the controlled station B₁ and to the other terminal 31 of the source of periodic current 32 to form a complete series-resonant circuit across the periodic-current supply terminals 30, 31. In other words, this series-resonant circuit comprises connections from the primary adjustable reactance elements 12, 13 and from the secondary adjustable reactance elements 22, 23 to the control-signal translating path 10, 11 effective to cause the reactance elements to depart from resonance in accordance with variations in the values of the primary adjustable reactance elements. The motor 27 is of the two-phase type and is provided with a second phase winding 29 connected directly to the terminals 30 and 31. The motor 27 is also shown as having a shaft 33 for actuation of a secondary controllable device. The secondary adjustable reactance devices 22 and 23 are adapted for actuation in unison by the motor 27 through a mechanical link 26.

In describing the operation of the electrical control system of Fig. 1, it will be assumed that initially the circuit including the adjustable reactance elements 12, 13, 22, and 23 and the motor winding 28 is tuned to resonance at the frequency of the current from the source 32. Under these conditions, the currents in the windings 28 and 29 of the motor 27 will be substantially in phase so that the motor is balanced. If now the primary adjustable reactance elements 12 and 13 are manually adjusted in accordance with a change in position of the primary control element, the tuned circuit just described departs from resonance and the phase of the current through the winding 28 differs from that of the current through the winding 29, so that the motor 27 becomes unbalanced, resulting in a torque on the motor shaft 33 which thereupon rotates to adjust the position of the secondary controllable device. At the same time, the secondary adjustable reactance elements 22 and 23 are adjusted directly and independently of conditions at the control station through the mechanical link 26 until the condition of resonance is re-established.

By making the reactance elements 12 and 13 and 22 and 23, respectively, of the same type and designing them with complementary laws of reactance variation, the position of the motor shaft 33 can be made to follow very closely that of the primary control element at the control station A₁ to provide an accurate follow-up system. At the same time, the system is extremely sensitive since the resonant circuit may be designed with a very high ratio of reactance to resistance so that, for relatively slight departures of the circuit from resonance, there will be a substantial displacement in phase between the exciting currents to the motor windings and consequently a substantial torque output will be developed by the motor. At the same time, the adjustable reactance elements 12, 13, 22, and 23 may be made to have a substantially linear law of reactance variation, which gives a substantially uniform sensitivity over the complete range of adjustment.

It will be noted that only a two-conductor control-signal path between the stations A₁ and B₁ is required and that one of these conductors may be replaced by ground. Furthermore, the system involves no electrical contact devices, is substantially independent in sensitivity of variations in the voltage of the supply source 32, and has an accuracy which is determined primarily by the values of the electrical components of the resonant circuit rather than by precision mechanical elements. In addition, the adjustment of the secondary controllable device is entirely positive and unambiguous and it is virtually impossible for the control and controllable devices to get out of synchronism. While, in the arrangement of Fig. 1, the reactance elements 12 and 13 at the control station A₁ and elements 22 and 23 at the controlled station B₁ have all been shown as adjustable, reactance elements of one type may be made fixed and may be replaced by a single reactance element of the same type of equivalent electrical value at either the control station A₁ or the controlled station B₁, since these two elements are included in a single series-resonant circuit.

The electrical control system of Fig. 2 is in many respects similar to that of Fig. 1 and similar circuit elements have been given the same reference characters. In the circuit of Fig. 2, each of the windings 28 and 29 of the motor 27 is excited from the source 32 through a series-resonant circuit, one including an adjustable primary reactance element and the other including an adjustable secondary reactance element. In this modification the control station comprises only the primary adjustable inductance element 12 which is connected through the control-signal path 10, 11 in series with an additional fixed capacitance element or condenser 40 and the motor winding 28 across the terminals 30, 31. The motor winding 29 is connected in series with the secondary adjustable inductance element 22 in series with an additional fixed capacitance element or condenser 41 across the terminals 30, 31.

The characteristics of the circuit of Fig. 2 are generally similar to those described above in connection with the circuit of Fig. 1, any adjustment of the primary control element and the associated primary adjustable inductance 12 giving rise to a phase displacement between the excitation of the windings 28 and 29 of the motor 27 which is effective to adjust the resonant circuit including the reactance elements 22 and 41 to restore the phase coincidence of the motor winding excitation and the balance of the motor. The principal difference in the arrangement of Fig. 2 is that the calibration is not critically related to the supply frequency so that the system will operate satisfactorily over a reasonable range of frequencies. However, the sensitivity of the system is affected by wide variations of the frequency of the source 32 from the mean frequency of the resonant circuits.

In Fig. 3, there is represented a modified form of the invention in which the frequency of the source is automatically varied in operation so that the system is particularly suitable for use with a carrier frequency or radio link between the control station A3 and the controlled station B3. In the arrangement of Fig. 3, the control station includes a variable frequency generator 50 connected across the terminals 14, 15 of the station. Connected in series across the terminals 14 and 15 is a series-resonant circuit comprising the primary adjustable inductance 12, an additional fixed condenser 51, and a phase winding 28' of a two-phase motor 27', the other phase winding 29' of which is connected directly across the generator 50. The motor 27' is connected by a mechanical link 52 to adjust the frequency of the generator 50, which may be of any suitable type, for example, a vacuum-tube oscillator. At the controlled station B3 there is connected across the input terminals 24, 25 a series-resonant circuit comprising a secondary adjustable inductance element 22, an additional fixed condenser 53, and the winding 28 of the two-phase motor 27. The other winding 29 of the motor 27 is connected directly across the input terminals 24, 25. The motor 27 is adapted to adjust the secondary adjustable inductance element 22 by means of a mechanical link 54 and is, of course, connected for actuation of the secondary controllable device.

It is believed that the operation of the system of Fig. 3 will be clear from the foregoing explanations. Briefly, adjustment of the primary control element and the primary adjustable inductance element 12 is effective to alter the resonance of the series-resonant circuit including the motor winding 28' to unbalance the motor 27' which thereupon rotates to adjust the frequency of the generator 50 to the resonant frequency of the circuit comprising the adjustable inductance element 12. Variation of the frequency of the control signal transmitted over the conductors 10 and 11 to the controlled station B3 causes the secondary circuit including the secondary adjustable inductance element 22 to be out of resonance with the exciting current, thereby unbalancing the motor 27, which rotates to adjust the secondary reactance element 22 to restore its resonant circuit to resonance, at the same time actuating the secondary controllable device to a position corresponding to the new position of the primary control element.

In Fig. 4 is represented a modified form of the invention which is particularly suitable to a high-frequency link between the control station A4 and the controlled station B4. In this circuit arrangement, the control station A4 comprises a source of periodic current of high frequency E connected to excite the primary winding 61 of a transformer 60 having a pair of secondary windings 62 and 63 tuned by the adjustable primary condensers 64 and 65, respectively. The condensers 64 and 65 are connected by a mechanical link 59 to be adjusted in unison but in opposite senses by the primary control element. The resonant circuits 62, 64 and 63, 65 are connected to output terminals 66, 67 and 68, 69, respectively, of control station A4. The high-frequency source E is also connected directly to the output terminal 70.

The controlled station B4 includes a two-tube modulator comprising the tubes 80 and 81. To the grids of the tubes 80 and 81 are applied the voltages across the resonant circuits 62, 64 and 63, 65, respectively, by means of the control-signal conductors 71 and 72 connected to input terminals 74 and 75, respectively, and ground. Across the grid circuits of tubes 80 and 81 at the controlled station B4 are connected the secondary adjustable condensers 82 and 83, respectively, connected by a mechanical link 84 to be adjusted in unison but in opposite senses.

The controlled station B4 also includes a source of periodic current of low-frequency e which is connected to impress low-frequency voltages of opposite phase on the cathodes of the tubes 80 and 81 by means of a transformer, the primary winding 86 of which is connected to the source e and opposite terminals of the secondary winding 87 of which are connected to the cathodes of the tubes 80 and 81, while the mid-tap of the secondary winding 87 is connected to ground through a suitable bias source 88. Unidirectional operating potentials for the tubes 80 and 81 are supplied from a source indicated as +B through a suitable load resistor 89. The anode circuits of the tubes 80 and 81 are connected in parallel and through a condenser 90 feed into a load resistor 91. The high-frequency voltage from the source E impressed on the terminal 70 of the control station A4 is supplied over the control-signal conductor 73 to the terminal 76 of the controlled station B4 and also connected to supply a current of this frequency directly to the load resistor 91, the amplitude of this voltage preferably being at least as great as the peak value of the voltage output of each of the modulators 80 and 81. The resistor 91 is connected in the input circuit of a detector and low-frequency amplifier 92, which may be of any suitable type well known in the art. The output of the amplifier 92 is connected to one phase winding 29 of the two-phase motor 27, while the other winding 28 of the motor is connected across the low-frequency source e through a phase-shifting condenser 93.

In explaining the operation of the system of Fig. 4, it will be assumed that initially the resonant circuits including the primary adjustable condensers 64 and 65, the windings 62 and 63, and the secondary adjustable condensers 82 and 83 are adjusted to be resonant at the frequency of the high-frequency source E. Under these conditions, the high-frequency voltages impressed on the grids of the modulator tubes 80 and 81 are in phase, while the low-frequency voltages impressed upon the cathodes of these tubes from the source e are in phase opposition. At the same time, there is a shift of 90 degrees in the voltage across the resonant circuits 62, 64, 82 and 63, 65, 83 with respect to the primary voltage of the source E. As a result, there is also a 90-degree phase displacement between the unmodulated high-frequency voltage applied to the load resistor 91 from the input terminal 76 of the controlled station B4 and each of the modulated voltages applied to the resistor 91 from the anode circuits of the modulator tubes 80 and 81. Thus, the resultant sums of the unmodulated voltage from source E and each of the modulated voltages from modulator tubes 80 and 81 are equal as applied to the detector 92 but the low-frequency components of such resultants are in phase opposition so that there is no low-frequency output from the unit 92, the motor winding 29 is not excited, and the motor 27 develops no torque.

If now the primary control element is adjusted to adjust the setting of the primary adjustable condensers 64 and 65 to detune their respective resonant circuits in opposite senses, the voltages appearing thereacross and applied over the control-signal conductors 71, 72 to the grids of the modulator tubes 80, 81 will be shifted in phase in opposite senses by a relatively large angle for a relatively small adjustment of the primary control element. This causes the high-frequency voltages developed in the anode circuits of the modulator tubes 80 and 81 to be correspondingly shifted in phase in opposite senses. The resultant of the unmodulated voltage E and the modulated voltage output of one of the modulator tubes, for example, tube 80, is increased, since these two voltages are now nearly in phase, while the resultant of the unmodulated voltage E and the modulated voltage output of the other modulated tube 81 is decreased, since these two voltages are now nearly in phase opposition. Therefore, the low-frequency component of the first-mentioned resultant is much greater than that of the other resultant, the low-frequency modulation components are no longer balanced out in the output of detector 92, and the resultant low-frequency voltage in the output of detector 92, substantially in phase with that of the low-frequency source e, is applied to the phase winding 29 of the motor 28. Since the motor winding 28 is excited substantially in quadrature with respect to the voltage of the source e, the motor 27 develops a torque which is effective to adjust the secondary adjustable condensers 82 and 83 until the resonant circuits 62, 64, 82 and 63, 65, 83 are restored to resonance and at the same time to actuate the secondary controllable device to a new position corresponding to the adjusted position of the primary control element.

In case the primary control element is adjusted in the opposite sense, the operation is similar to that described above with the exception that the resultant of the unmodulated voltage E and the modulated voltage output of modulator tube 81 is now the greater and its low-frequency modulation component now predominates in the output of detector 92. Since this low-frequency component is in phase opposition to that developed under the previously assumed conditions, the motor 27 rotates in an opposite direction to restore the system to balance.

It will be noted that the system of Fig. 4 has all of the advantages of the systems of Figs. 1, 2, and 3 and, in addition, is extremely sensitive due to the large shift in phase of the voltages across the resonant circuits for relatively small departures from resonance. While the system of Fig. 4 has been illustrated and described as utilizing a pair of adjustable reactance elements variable in opposite senses at both the control station and the controlled station, it will be understood that only a single reactance element at each station may be made adjustable and the other made fixed, but such an arrangement has a somewhat lesser sensitivity.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An electrical control system adapted to control a secondary controllable device comprising, a control station including an electrical apparatus subject to variations in a predetermined electrical condition thereof, a controlled station including adjustable reactance means, a control-signal translating path between said stations, one of said stations having periodic-current supply terminals, additional reactance means connected in circuit with said adjustable reactance means to resonate therewith, connections from said electrical apparatus and from said reactance means to said control-signal translating path effective to cause said reactance means to depart from resonance in accordance with variations in said electrical condition of said apparatus, and a normally balanced phase-responsive device at said controlled station connected to be energized from said supply terminals and unbalanced in response to departures from resonance of said reactance means, due to variations in said electrical condition of said apparatus, for adjusting said reactance means directly and independently of conditions at said control station to restore its balance and for actuating said secondary controllable device.

2. An electrical control system adapted to control a secondary controllable device comprising, a control station including primary adjustable reactance means, a controlled station including secondary adjustable reactance means, a control-signal translating path between said stations, one of said stations having periodic-current supply terminals, additional reactance means connected in circuit with said adjustable reactance means to resonate therewith, and a normally balanced phase-responsive device at said controlled station connected to be energized from said supply terminals and unbalanced in response to departures from resonance of said reactance means, due to adjustments of said primary reactance means, for adjusting said secondary reactance means to restore its balance and for actuating said secondary controllable device.

3. An electrical control system adapted to control a secondary controllable device comprising, a control station including primary adjustable inductive reactance means, a controlled station including secondary adjustable inductive reactance means, a control-signal translating path between said stations, one of said stations having periodic-current supply terminals, capacitive reactance means connected in circuit with said adjustable reactance means to resonate therewith, and a normally balanced phase-responsive device at said controlled station connected to be energized from said supply terminals and unbalanced in response to departures from resonance of said reactance means, due to adjustments of said primary reactance means, for adjusting said secondary reactance means to restore its balance and for actuating said secondary controllable device.

4. An electrical control system adapted to control a secondary controllable device comprising, a control station including primary adjustable reactance means, a controlled station including secondary adjustable reactance means, a control-signal translating path between said stations, one of said stations having periodic-current supply terminals, additional reactance means connected in circuit with said adjustable reactance means to resonate therewith, and a normally balanced two-phase motor at said controlled station connected to be energized from said supply terminals and having two phase windings one of which is so connected thereto through certain of said reactance means that the excitations of both windings are in phase when said reactance means are adjusted to resonance and differ in phase in response to departures from resonance of said reactance means, due to adjustments of said primary reactance means, said motor being connected for adjusting said secondary reactance means to restore its balance and for actuating said secondary controllable device.

5. An electrical control system adapted to control a secondary controllable device comprising, a control station including primary adjustable reactance means, a controlled station including secondary adjustable reactance means, a control-signal translating path between said stations, one of said stations having periodic-current supply terminals, additional reactance means connected in circuit with said adjustable reactance means to resonate therewith, and a normally balanced two-phase motor at said controlled station connected to be energized from said supply terminals and having two phase windings one of which is so connected thereto through said secondary reactance means that the excitations of both windings are in phase when said reactance means are adjusted to resonance and differ in phase in response to departures from resonance of said reactance means, due to adjustments of said primary reactance means, said motor being connected for adjusting said secondary reactance means to restore its balance and for actuating said secondary controllable device.

6. An electrical control system adapted to control a secondary controllable device comprising, a control station including primary adjustable reactance means, a controlled station including secondary adjustable reactance means of the same type as said primary reactance means and having complementary laws of reactance variation, a control-signal translating path between said stations, one of said stations having periodic-current supply terminals, additional reactance means connected in circuit with said adjustable reactance means to resonate therewith, and a normally balanced phase-responsive device at said controlled station connected to be energized from said supply terminals and unbalanced in response to departures from resonance of said reactance means, due to adjustments of said primary reactance means, for adjusting said secondary reactance means to restore its balance and for actuating said secondary controllable device.

7. An electrical control system adapted to control a secondary controllable device comprising, a control station including primary adjustable reactance means, a controlled station including secondary adjustable reactance means, a control-signal translating path between said stations, said controlled station having periodic-current supply terminals, additional reactance means connected in circuit with said adjustable reactance means to form a resonant circuit, and a normally balanced phase-responsive device at said controlled station connected to be energized from said supply terminals and unbalanced in response to departures from resonance of said resonant circuit, due to adjustments of said primary reactance means, for adjusting said secondary reactance means to restore its balance and for actuating said secondary controllable device.

8. An electrical control system adapted to control a secondary controllable device comprising, a control station including primary adjustable reactance means, a controlled station including secondary adjustable reactance means, a control-signal translating path between said stations, one of said stations having periodic-current supply terminals, a resonant circuit including said primary and secondary reactance means, and a normally balanced phase-responsive device at said controlled station connected to be energized from said supply terminals and unbalanced in response to departures from resonance of said resonant circuit, due to adjustments of said primary reactance means, for adjusting said secondary reactance means to restore its balance and for actuating said secondary controllable device.

9. An electrical control system adapted to control a secondary controllable device comprising, a control station including primary adjustable reactance means, a controlled station including secondary adjustable reactance means, a control-signal translating path between said stations, one of said stations having periodic-current supply terminals, a series-resonant circuit including said primary and secondary reactance means, and a two-phase motor having one winding connected directly to said supply terminals and a second winding connected thereto through said resonant circuit, whereby said motor is balanced when said circuit is in resonance and unbalanced in response to departures of said circuit from resonance, due to adjustments of said primary reactance means, said motor being connected for adjusting said secondary reactance means to restore its balance and for actuating said secondary controllable device.

10. An electrical control system adapted to control a secondary controllable device comprising, a control station including a source of periodic current of variable frequency, a controlled station including an adjustable reactance means, a control-signal translating path between said stations, additional reactance means connected with said adjustable reactance means to form a resonant circuit, and a normally balanced phase-responsive device at said controlled station connected to be energized from said source of periodic current and to be unbalanced in response to departures of said resonant circuit from resonance to said periodic current, said device being connected to adjust said adjustable reactance means to maintain said resonant circuit in resonance with said periodic current and being adapted for actuation of said secondary controllable device.

11. An electrical control system adapted to control a secondary controllable device comprising, a control station including primary adjustable reactance means, a controlled station including secondary adjustable reactance means, a control-signal translating path between said stations, a variable frequency generator at said control station, a plurality of additional reactance elements individually connected in circuit with said adjustable reactance elements to form two resonant circuits, one at each of said stations, a normally balanced phase-responsive device at each of said stations connected to be energized from said generator and unbalanced in response to departure of its respective resonant circuit from resonance to the currents generated by said generator, said phase-responsive device at said control station being connected to said generator to adjust its freqeuncy to the resonant frequency of its associated resonant circuit as modified by adjustments of said primary reactance means, and said phase-responsive device at said controlled station being connected to adjust its respective adjustable reactance means to restore its resonant circuit to resonance with said generator and being adapted to actuate said controllable device.

12. An electrical control system adapted to control a secondary controllable device comprising, a control station including primary adjustable reactance means, a controlled station including secondary adjustable reactance means, a control-signal translating path between said stations, a variable frequency generator at said control station, a plurality of additional reactance elements individually connected in circuit with said adjustable reactance elements to form two series-resonant circuits, one at each of said stations, a two-phase motor at each of said stations, each of said motors having one winding connected to be energized from said generator without phase displacement and a second winding connected to be energized from said generator through its respective resonant circuit, whereby each of said motors is balanced when its respective resonant circuit is in resonance at the frequency of said generator, said motor at said control station being connected to said generator to adjust its frequency to the resonant frequency of its associated resonant circuit as modified by adjustments of said primary reactance means, and said motor at said controlled station being connected to adjust its respective adjustable reactance means to restore its resonant circuit to resonance with said generator and being adapted to actuate said controllable device.

13. An electrical control system adapted to control a secondary controllable device comprising, a control station including primary adjustable reactance means, a controlled station including secondary adjustable reactance means, a control-signal translating path between said stations, high-frequency supply terminals at one of said stations, low frequency supply terminals at the other of said stations, additional reactance means connected in circuit with said adjustable reactance means to resonate therewith at the frequency of said high-frequency supply, modulator means at said control station connected to be energized from both of said terminals and normally balanced with respect to said low-frequency supply, said modulator means being unbalanced with respect to said low-frequency supply in response to departures from resonance of said reactance means, due to adjustments of said primary reactance means, and a phase-responsive device coupled to said modulator and to said low-frequency supply terminals for adjusting said secondary reactance means for rebalancing said modulator and for actuating said secondary controllable device.

14. An electrical control system adapted to control a secondary controllable device comprising, a control station including primary adjustable reactance means, a controlled station including secondary adjustable reactance means, a control-signal translating path between said stations, high-frequency supply terminals at one of said stations, low-frequency supply terminals at one of said stations, additional reactance means connected in circuit with said adjustable reactance means to resonate therewith at the frequency of said high-frequency supply, a two-tube modulator, means for deriving from said reactance means two voltages normally of the same phase and which vary in phase in opposite senses with departures of said reactance means from resonance and for individually applying said voltages to the tubes of said modulator, means for coupling said tubes in phase opposition to said low-frequency terminals, means for deriving from said high-frequency terminals a voltage normally in quadrature with that applied to said modulator tube and combining it with the output of said modulator, a detector to which said combined voltages are applied and a phase-responsive device coupled to said detector and to said low-frequency terminals and responsive to departures of said reactance means from resonance for adjusting said secondary reactance means to restore it to resonance and for actuating said secondary controllable device.

15. An electrical control system adapted to control a secondary controllable device comprising, a control station including an electrical apparatus subject to variations in a predetermined electrical condition thereof, a controlled station including adjustable reactance means, a control-signal translating path between said stations, one of said stations having periodic-current supply terminals, additional reactance means connected in series with said adjustable reactance means to resonate therewith, connections from said electrical apparatus and from said reactance means to said control-signal translating path effective to cause said reactance means to depart from resonance in accordance with variations in said electrical condition of said apparatus, and a normally balanced phase-responsive device at said controlled station having a winding connected to be energized from said supply terminals in series with said resonant circuit, said phase-responsive means being responsive primarily to variations in the phase of the current through said series-resonant circuit, due to variations in said electrical condition of said apparatus, and being effective to adjust said reactance means to restore its balance and to actuate said secondary controllable device.

DAVID W. MOORE, JR.